United States Patent [19]
Marshall et al.

[11] Patent Number: 5,997,259
[45] Date of Patent: Dec. 7, 1999

[54] ELECTRONIC ENGINE - AIR COMPRESSOR SYSTEM

[75] Inventors: Brian P. Marshall, Fort Wayne; David E. Hockemeyer, Monroeville, both of Ind.

[73] Assignee: Navistar International Transportation Corp., Chicago, Ill.

[21] Appl. No.: 09/071,129

[22] Filed: Apr. 30, 1998

[51] Int. Cl.$^6$ ...................................................... F04B 17/00
[52] U.S. Cl. ........................... 417/349; 417/364; 417/440
[58] Field of Search ................................ 123/70; 417/349, 417/364, 237, 236, 297, 440

[56] References Cited

U.S. PATENT DOCUMENTS

| | | |
|---|---|---|
| 3,744,934 | 7/1973 | Ueno . |
| 4,210,109 | 7/1980 | Nakajima et al. ......................... 123/76 |
| 4,429,532 | 2/1984 | Jakuba . |
| 5,666,931 | 9/1997 | Pierik et al. ............................. 123/568 |
| 5,802,846 | 9/1998 | Bailey ....................................... 60/278 |

*Primary Examiner*—Philip H. Leung
*Assistant Examiner*—Vinod D Patel
*Attorney, Agent, or Firm*—Jerry P. Calfa; Dennis K. Sullivan

[57] ABSTRACT

An electronically controlled diesel engine for a vehicle which may act as an air compressor in addition to acting as a power source for the vehicle. When acting in the air compressor function, one end cylinder is converted to the function to provide compressed air to air tanks on the vehicle. The air from this combination compressor and power cylinder may be used to fill air tanks which provide air for braking in vehicles such as heavy trucks. The combination compressor and power cylinder has an exhaust isolation valve in the exhaust manifold to isolate an air collection area and a relief/check valve engaged on an upstream side to the air collection area and to an air tank in the air system for the vehicle on the downstream side. An electronic controller means controls the fuel injector for the combination compressor and power cylinder and the exhaust isolation valve. Various types of diesel engines may be modified to become an electronic engine-air compressor system in accordance with this invention.

9 Claims, 4 Drawing Sheets

ELECTRONIC ENGINE - AIR COMPRESSOR SYSTEM

BACKGROUND OF THE INVENTION

The present invention relates to an electronically controlled diesel engine for a vehicle which may act as an air compressor in addition to acting as a power source for the vehicle. When acting in the air compressor function, one end cylinder is converted to the function to provide compressed air to air tanks on the vehicle. The air from this combination compressor and power cylinder may be used to fill air tanks which provide air for braking in vehicles such as heavy trucks. Various types of diesel engines may be modified to become an electronic engine-air compressor system in accordance with this invention.

Prior Art

Heretofore, diesel engines have existed which may be temporarily act as air compressors. One type of prior art diesel engine which could act as an air compressor involved tapping off pressurized air output from the turbo charger from the intake manifold. This prior art diesel engine is shown in U.S. Pat. No. 4,429,532. Diesel engines have a sets of combustion cylinders which have pistons which cycle in the cylinders when the engines are operated. Should fuel be shut off to the fuel injectors of one of these combustion cylinders during engine operation while maintaining the piston movement, efficient compression of air entering the cylinder will occur and exhausting to the exhaust manifold. The prior art diesel engine shown in U.S. Pat. No. 4,429,532 did not take advantage of this air compression in the cylinder to pressurize air for the vehicle air system.

Diesel engine cylinders have an intake valve and an exhaust valve. The intake valves, exhaust valves and injection valves cycle open and closed to allow the pistons to reciprocally move in the cylinders through an intake stroke, a compression stroke, an expansion stroke, and an exhaust stroke. Another prior art diesel engine electronically varied the movement of two or half of the pistons in the cylinders of an in-line four cylinder diesel engine to reverse motor the impacted cylinders. The fuel injectors in the reverse motoring cylinders would be shut off and the compressed gas would be discharged via the intake valves to the intake manifold. An example of this type prior art engine is shown in U.S. Pat. No. 5,226,401. Although this engine did involve air compression in an engine cylinder starved of fuel, there was a complex scheme involved in varying the movement of the intake and exhaust valves from their normal cycling for combustion. Additionally, the engine shown in U.S. Pat. No. 5,226,401 was not engaged to the vehicle's air system to allow controlled delivery of pressurized air. Air compressed in this prior art engine was redirected to the intake manifold to assist in engine pollutant reduction.

Another type prior art engine with a compressor function is shown in U.S. Pat. No. 3,744,934 where some of the cylinders may be converted to a compressor function. An engine internal switching means was required to accomplish the dual function so as to vary intake and exhaust valve cycling.

None of the prior art mentioned diesel engines with air compressor functions could be easily manufactured from simple modifications to an existing diesel engine exhaust system without varying intake and exhaust valve cycling.

Heretofore, an electronically controlled diesel engine for a vehicle which may act as an air compressor has not been suggested which utilizes the exhaust stroke of one piston of a cylinder of the engine, is capable of discharging the exhausted air to the vehicle air system, does not vary the cycling of the engine intake and exhaust valves and which may be easily manufactured with simple modifications to an existing diesel engine.

SUMMARY OF THE INVENTION

Accordingly, it is a primary object of the invention to provide an electronically controlled diesel engine for a vehicle which may act as an air compressor which utilizes the exhaust stroke of one piston of a cylinder of the engine to compress air in an isolated portion of the exhaust manifold.

A second object of the invention is to provide a diesel engine which may act as an air compressor which is capable of discharging the exhausted air to the vehicle air system to recharge an air tank in the air system.

A third object of the invention is to provide a diesel engine which may act as an air compressor that does not vary the cycling of the engine intake and exhaust valves to achieve the air compression.

A fourth object of the invention is to provide a diesel engine which may act as an air compressor which may be easily manufactured with simple modifications to the exhaust manifold of an existing diesel engine.

All the objects of the invention are satisfied with an electronically controlled diesel engine for a vehicle which when acting in the air compressor function, one end cylinder is converted to the function to provide compressed air to air tanks on the vehicle. More specifically, there is an exhaust isolation valve in the engine's common exhaust manifold which closes to isolate the portion of the exhaust manifold where the compressor cylinder discharges exhaust gases. This isolable portion of the exhaust manifold has a tap off to a relief/check valve. The discharge from this relief/check valve is directed to an air tank in the vehicle's air system. When the combination compressor and power cylinder is shifted to the compressor function, the exhaust isolation valve closes and the fuel injector for the cylinder secures injecting fuel due to signals from an electronic controller for the engine. Air pressure builds up in the isolated section of the exhaust manifold as the cylinder continues to cycle with the engine continuing to run. When the air pressure achieves a preset value, the relief/check valve opens to transfer the compressed air to the air tank. When the air tanks achieve a present pressure, the exhaust isolation valve opens to release the exhaust gases to the normal discharge path and the relief/check valve closes as pressure in the previously isolated portion of the manifold decreases.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
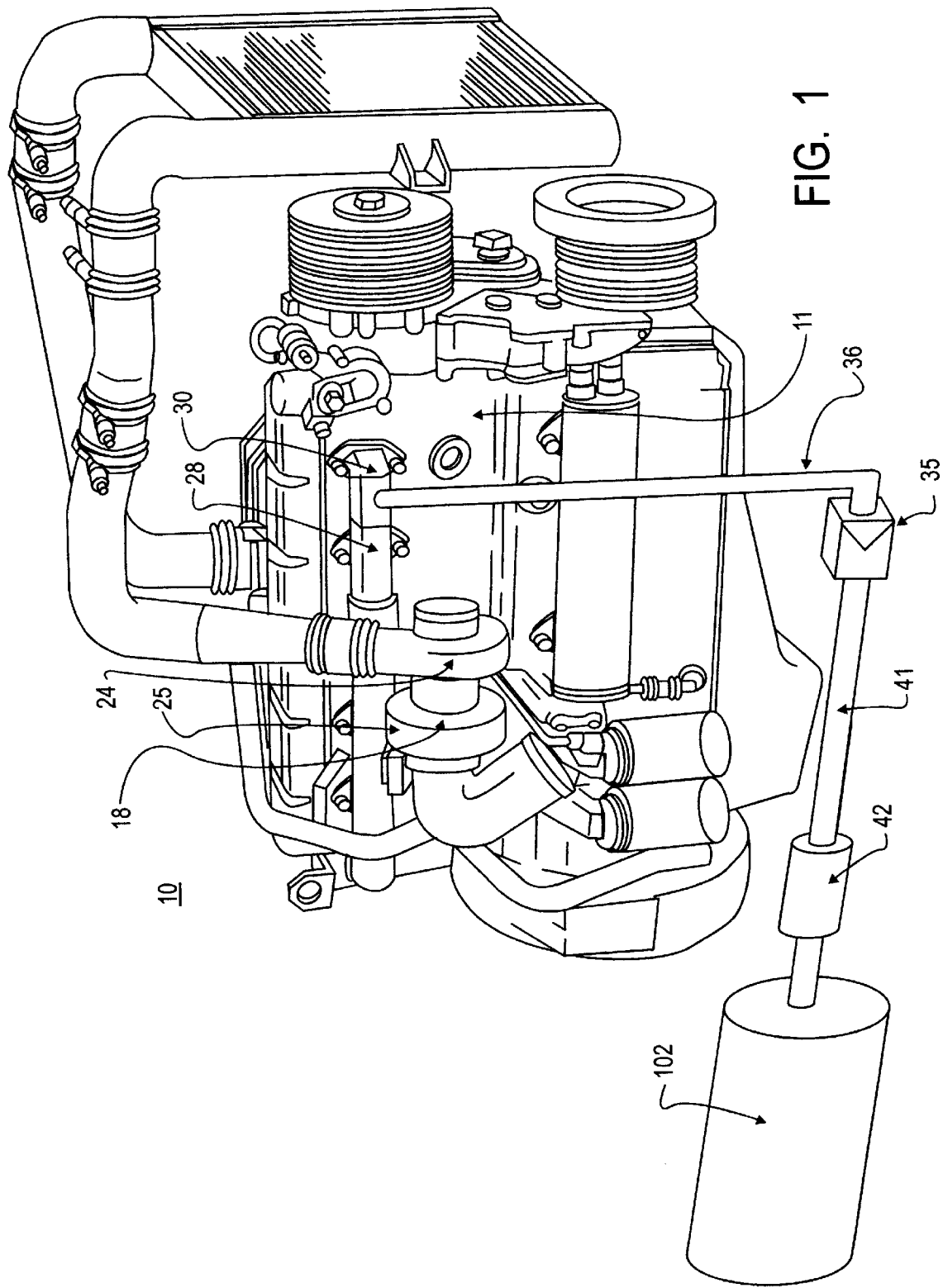
FIG. 1 is a perspective view of a diesel engine engaged to an air tank of a vehicle air system in accordance with this invention.

Referring now to the drawings in greater detail, in FIGS. 1 to 5, there is shown an electronically controlled diesel engine 10 for a vehicle 101 (not shown) which may act as an air compressor in addition to acting as a power source for the vehicle 101 made in accordance with this invention. The engine 10 includes an engine block 11 with cylinder bores 12 to define cylinders 13. Within each cylinder 13 is a piston 14 to reciprocally move in the cylinders 13 through an intake stroke, a compression stroke, an expansion stroke, and an exhaust stroke when the engine 10 operates. Each said piston 14 is mechanically engaged to a crank shaft 51 (not shown). Each cylinder 13 additionally has an intake valve 21, an exhaust valve 22, and a fuel injector 23. The intake valve 21 and the exhaust valve 22 open and close in concert with pressurized injection of fuel by the fuel injector 23 to cause the four separate strokes of the piston 14. The engine 10 includes an intake manifold 15, engaged to the engine block 11, which defines an intake manifold passage 16 and a plurality of interconnected intake manifold branch passages 17. The intake manifold branch passages 17 are in fluid communication with the intake valves 21.

The engine 10 further includes a turbocharger 18 having an incoming turbo air compressor 24 and an exhaust gas driven turbine 25. The compressor 18 is operatively connected to the intake manifold 16 by an intake conduit 26 providing supercharged air to combustion chambers 27 of the cylinders 13. A cooler 47 is interposed in the intake conduit 26 between the compressor 18 and the intake manifold passage 16. An exhaust manifold 28 is engaged to the engine block 11 for conducting gas from the exhaust valves 22 and hence the combustion chambers 27. The exhaust manifold 28 defines an exhaust manifold passage 29 and a plurality of interconnected exhaust manifold branch passages 30. The exhaust manifold branch passages 30 are in fluid communication with the exhaust valves 22. The exhaust gas turbine 25 is operatively connected to the exhaust manifold passage 29 by an exhaust gas conduit 32. Exhaust gas from the combustion chambers 27 drives the turbine 25 which in turn drives the turbo air compressor 24 in a conventional manner.

Figure 2:
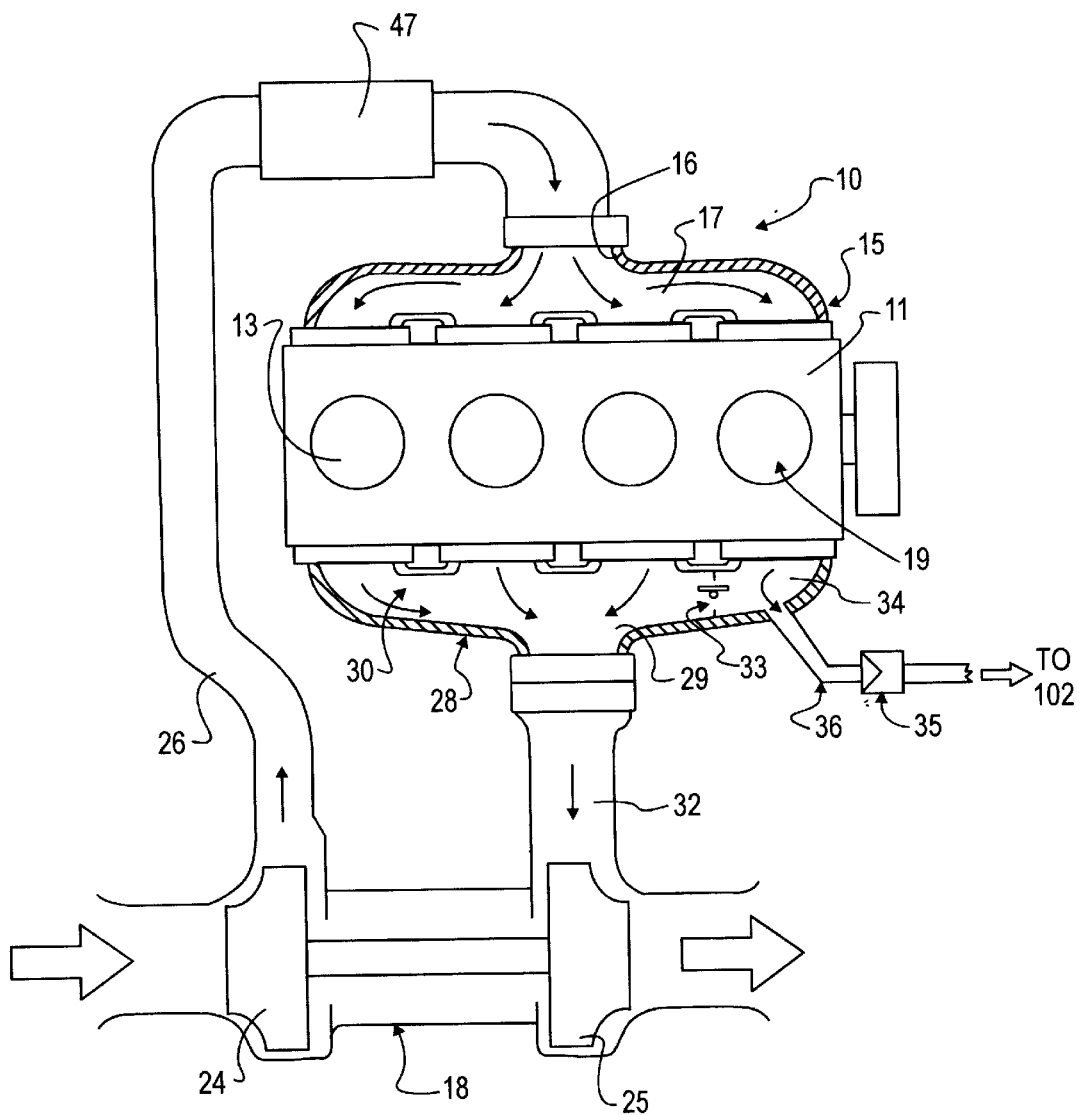
FIG. 2 is a diagrammatic plan partially sectional view of the engine of FIG. 1 with a combination compressor and power cylinder operating in a power generation mode.
Figure 3:
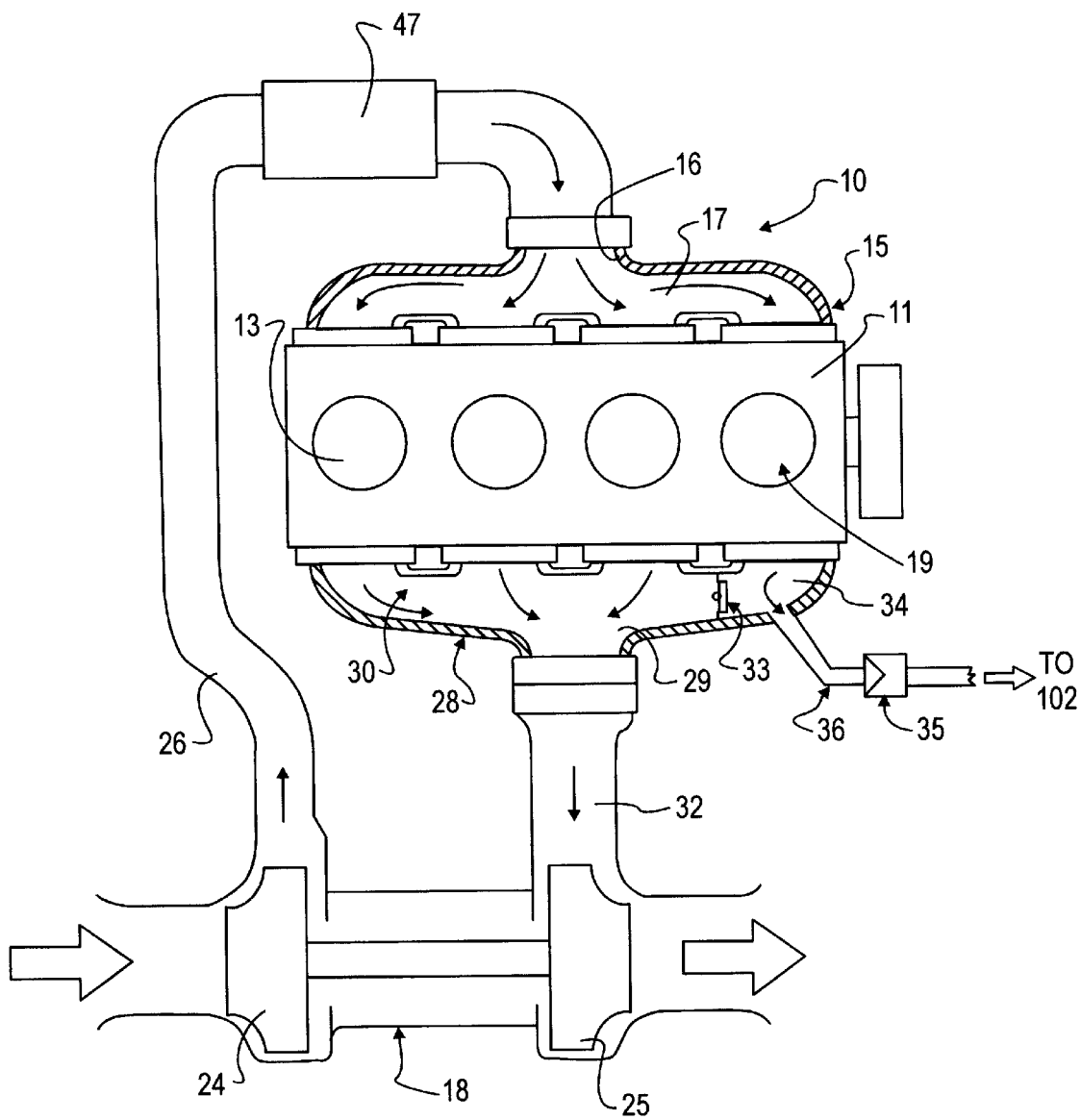
FIG. 3 is a diagrammatic plan partially sectional view of the engine of FIG. 1 with a combination compressor and power cylinder operating in an air compression mode.
Figure 4:
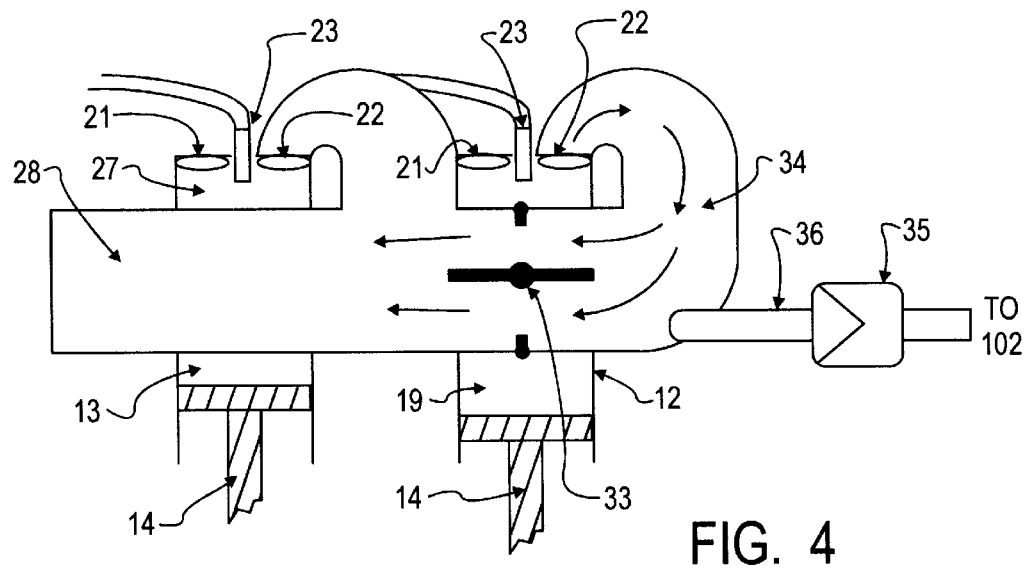
FIG. 4 is a partial diagrammatic cutaway view of the combination compressor and power cylinder of FIG. 2.
Figure 5:
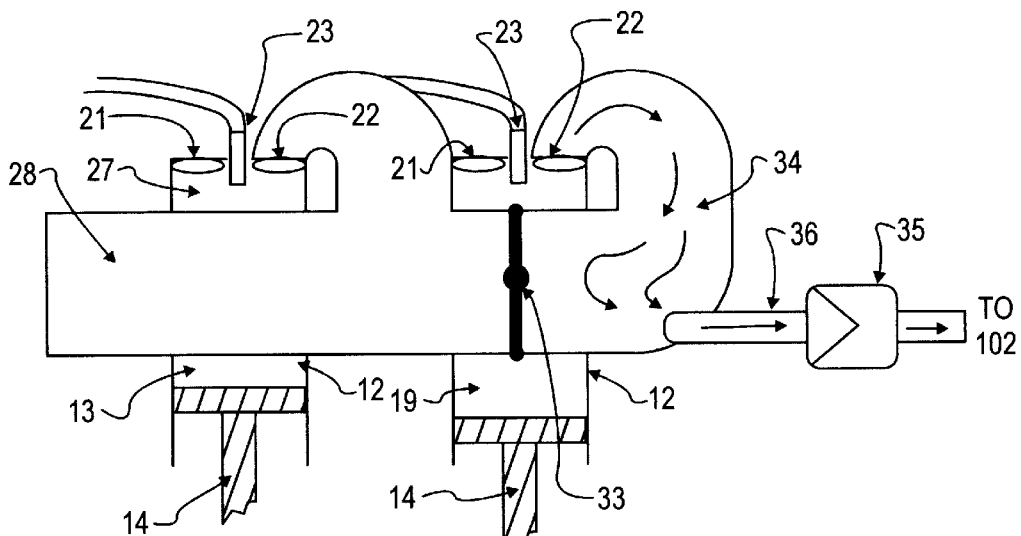
FIG. 5 is a partial diagrammatic cutaway view of the combination compressor and power cylinder of FIG. 3.

One end cylinder 13 is designated as a combination compressor and power cylinder 19 to provide compressed air upon demand to an air tank 102 in the air system 103 (not shown) on the vehicle 101. The combination compressor and power cylinder 19 may operate in either a power generation mode as shown in FIGS. 2 and 4, or; the combination compressor and power cylinder 19 may also operate in an air compression mode as shown in FIGS. 3 and 5. More specifically, there is an exhaust isolation valve 33 in the exhaust manifold branch passage 30 engaged to the exhaust valve 22 for the combination compressor and power cylinder 19. When the exhaust isolation valve 33 closes, an air collection area 34 of the exhaust manifold branch passage 30 associated with the combination compressor and power cylinder 19 is isolated. The exhaust isolation valve 33 is shown as a flapper valve, however, it may be any valve which will isolate the air collection area to accumulate air pressure increases and will also provide little head loss when the exhaust isolation valve 33 is open. The air collection area 34 is operatively engaged to a relief or one way check valve 35 through an air supply line 36 on an upstream side of the relief/check valve 35. The relief/check valve 35 is set to open a preset value of air pressure on the upstream or the air collection area 34 side of the relief/check valve 35. In the preferred embodiment, the relief/check valve 35 will open when the pressure in the air collection area 34 reaches or exceeds forty pounds per square inch gauge (40 psig). The discharge from the relief/check valve 35 is directed on the downstream side to the air tank 102 through air piping 41. There is an air dryer 42 operatively engaged in the flow path in air piping 41 between the relief/check valve 35 and the air tank 102 in the air system 103.

The engine 10 has an electronic controller means 93 (not shown) of type commonly used on modern day diesel engines. The electronic controller means 93 which may be programmable controls the operation of the exhaust isolation valve 33 and the fuel injector 23 of the combination compressor and power cylinder 19. This control results in the combination compressor and power cylinder 19 shifting between the power generation and air compression modes. The air system 103 contains pressure sensors 111 (not shown) which detect pressure in the air tank 102. The pressure sensors 111 provide input signals to the electronic controller means 93 so the electronic controller means will shift to between the combination compressor and power cylinder 19 between the power generation and air compression modes. During the power generation mode, the electronic controller means 93 allows normal injection of fuel through the fuel injector 23 of the combination compressor and power cylinder 19 to the combustion chamber 27 and maintains the exhaust isolation valve 33 in an open position to allow passage of exhaust gases to the exhaust gas conduit 32. When air pressure in the air tank 102, reaches a preset value, the electronic controller means 93 shifts the combination compressor and power cylinder 19 to the air compression mode as follows. Fuel injection through the fuel injector 23 of the combination compressor and power cylinder 19 is stopped. The piston 14 of the combination compressor and power cylinder 19 continues to cycle as does the intake valve 21 and the exhaust valve 22. This cycling of the piston 14 causes the air collection area 34 to be purged of combustion gases. The preferred number of piston 14 cycles is when five (5) times the volume of the air collection area 34 has flowed through the air collection area 34. This should prevent contamination of the air system 103 of gaseous combustion products. After the air collection area 34 is purged, the electronic controller means 93 closes the exhaust isolation valve 33 to isolate the air collection area 34. As a result air pressure builds up in the air collection area 34 as the piston 14 continues to cycle in the combination compressor and power cylinder 19. When air pressure in the air collection area 34 reaches a preset value, preferably 40 psig, the relief/check valve will open discharging pressurized air to the air tank 102 through the air dryer 42. Once air pressure in the air tank 102 increases to a preset value, preferably 120 psig, the electronic controller means 93 will open the exhaust isolation valve 33. This will cause a pressure reduction in the air collection area 34 and as a result cause the relief/check to close. The electronic controller means 93 will then allow operation of the fuel injector 23 for the combination compressor and power cylinder 19 to return the cylinder to the power generation mode.

The electronic controller means 93 will shift the combination compressor and power cylinder 19 to the air compression mode whenever the pressure in the air tank 102 or in the air system 103 is less than a high setpoint of preferably approximately 120 psig and the driver is not depressing an accelerator pedal 108 (not shown) of the vehicle 101. The cylinder 19 will return to the power generation mode when air pressure reaches 120 psig. This higher setpoint will ensure air recharging of the air tank 102 occurs only when there is no power demand on the engine 10. The electronic controller means 93 will shift the combination compressor and power cylinder 19 to the air compression mode whenever the pressure in the air tank 102 or in the air system 103 falls below a low setpoint of preferably approximately 100 psig regardless of the whether the accelerator pedal 108 is depressed and stay in the air compression mode until air pressure reaches 100 psig. This lower setpoint ensures that that there will be air for braking in the air tank 102 regardless of power needs. There may also be a dash board mounted indicating lamp 109 (not shown) indicating when the combination compressor and power cylinder 19 is in the air compression mode.

Various types of diesel engines may be converted to an engine 10 in accordance with this invention by merely replacing the factory supplied exhaust manifold branch passage 30 with one with an exhaust isolation valve 33 and a relief/check valve engaged to an air tank 102, by adding a pressure sensor 111 to the air system 103 which provides signals to the electronic controller means 93, and by reprogramming the electronic controller means 93 in accordance with the above described control scheme.

As described above, the engine 10 with the combination compressor and power cylinder 19 of the present invention provides a number of advantages, some of which have been described above and others of which are inherent in the invention. Also modifications may be proposed to the engine 10 with the combination compressor and power cylinder 19 without departing from the teachings herein. Accordingly, the scope of the invention is only to be limited as necessitated by the accompanying claims.

We claim:

1. An electronically controlled diesel engine for a vehicle with an accelerator pedal, an air system and an air tank for producing power and for compressing air to replenish the air tank, comprising:
   a. an engine block;
   b. cylinder bores in said engine block to define cylinders;
   c. a piston in each said cylinder;
   d. each said piston engaged to a crank shaft;
   e. each said cylinder has an intake valve, an exhaust valve and a fuel injector;
   f. an electronic controller means for controlling said fuel injectors;
   g. an exhaust manifold engaged to said engine block;
   h. said exhaust manifold having exhaust manifold branch passages corresponding to each of said cylinders and a common exhaust valve passage;
   i. said exhaust manifold branch passages in fluid communication with said exhaust valves and said exhaust valve passage;
   j. an end cylinder of one of said cylinders being designated as a combination compressor and power cylinder;
   k. said combination compressor and power cylinder having an exhaust isolation valve in said exhaust manifold branch passage in fluid communication with said exhaust valve for said combination compressor and power cylinder;
   l. said electronic controller means capable of securing fuel injection through said fuel injector for said combination compressor and power cylinder to enter into an air compression mode;
   m. said electronic controller means capable of closing said exhaust isolation valve upon a sensed air pressure reduction in the air tank to isolate an air collection area in said exhaust valve manifold branch passage for said combination compressor and power cylinder while in said air compression mode;
   n. a relief/check valve functionally engaged to said air collection area on an upstream side and to the air tank through air piping on a downstream side;
   o. said relief/check valve set to open upon a preset air pressure in said air collection area to supply air from said air collection area to the air tank; and
   p. said electronic controller means capable of opening said exhaust isolation valve upon a sensed air pressure increase in the air tank to allow exhaust flow to pass through said exhaust valve manifold branch passage for said combination compressor and power cylinder to said exhaust manifold passage to enter into a power generation mode;
   q. said relief/check valve set to close upon a preset reset air pressure in said air collection area to isolate said air collection area from the air tank; and
   r. said electronic controller means capable allowing fuel injection through said fuel injector for said combination compressor and power cylinder while in a power generation mode.

2. The electronically controlled diesel engine of claim 1, wherein there is an air dryer operatively engaged between said relief/check valve and the air tank.

3. The electronically controlled diesel engine of claim 1, wherein:
   a. said electronic controller means sequentially secures fuel injection through fuel injector for said combination compressor and power cylinder before closing said exhaust isolation valve when entering said air compression mode to allow purging of a predetermined volume of gases through said air collection area.

4. The electronically controlled diesel engine of claim 3, wherein:
   a. said predetermined volume of gas purging is five times the volume of said air collection area.

5. The electronically controlled diesel engine of claim 1, wherein:
   a. said preset air pressure in said air collection area for said relief/check valve to open is 40 psig.

6. The electronically controlled diesel engine of claim 1, wherein:
   a. said electronic controller means is additionally comprised of a sensor of whether the accelerator pedal is depressed; and
   b. said electronic controller means will secure fuel injection through said fuel injector for said combination compressor and power cylinder and close said exhaust isolation valve to enter said air compression mode when air pressure in the air tank reaches a high setpoint and said electronic controller means senses that the accelerator pedal is not depressed.

7. The electronically controlled diesel engine of claim 6, wherein said high setpoint is approximately 120 psig.

8. The electronically controlled diesel engine of claim 7, wherein:
   a. said electronic controller means will secure fuel injection through said fuel injector for said combination compressor and power cylinder and close said exhaust isolation valve to enter said air compression mode when air pressure in the air tank reaches a low setpoint.

9. The electronically controlled diesel engine of claim 8, wherein said low setpoint is approximately 100 psig.

* * * * *